Patented Apr. 8, 1952

2,591,884

UNITED STATES PATENT OFFICE 2,591,884

ALKYD RESIN-DIISOCYANATE CELLULAR FOAMED PLASTICS

Eli Simon, Los Angeles, and Frank W. Thomas, Burbank, Calif., assignors to Lockheed Aircraft Corporation, Burbank, Calif.

No Drawing. Application February 17, 1949, Serial No. 77,058

24 Claims. (Cl. 260—2.5)

This invention relates to foamed cellular plastics and relates more particularly to improved cellular plastics incorporating thermoplastic film-forming resinous additives which serve as foam stabilizers during the foaming reaction of the alkyd resin-diisocyanate mixture.

In our copending applications, Serial No. 35,294 filed June 25, 1948, now Patent 2,577,279; Serial No. 44,993 filed August 18, 1948, now abandoned; Serial No. 50,007 filed September 18, 1948, now Patent 2,577,280 and Serial No. 54,822 filed October 15, 1948, now Patent 2,577,281, we have disclosed several methods and formulations for making low density cellular foamed plastics of such character that the component ingredients are simply mixed together and poured into a cavity to react at atmospheric pressure to assume the cellular condition. The formulations included in our copending applications are primarily systems comprising alkyd resin, metatoluene diisocyanate and water and we obtained effective foaming action by controlling the water content and/or by the mode in which the water is incorporated in the reactant mixture and/or by the employment of additives such as metallic leafing powders and metallic soap powders.

We have discovered that the incorporation, in the alkyd resin-diisocyanate systems, of a high molecular weight film-forming polymeric thermoplastic resin additive avoids the necessity of using metallic leafing powders, metallic soap powders, or the like, and results in superior low density cellular plastics.

Accordingly, it is an object of the present invention to provide alkyd resin-diisocyanate formulations for producing low density cellular plastics characterized by high molecular weight thermoplastic film-forming polymeric resin additives which serve as film stabilizers during the foaming reaction to obtain cellular plastics of superior physical characteristics. During the foaming reaction of the alkyd resin-diisocyanate-water mixture, it is important to properly relate or balance the rate of blow or expansion and the rate of cure. The foaming mass must possess sufficient plasticity to expand by the liberated gas of the reaction otherwise the cells will not form. However, if the mass does not have sufficient elasticity the freshly formed gas cells collapse and an adequate volume of foam is not obtained. In the event of such cell collapse the gas escapes through the mass so that the pressure essential to the expansion of the mass is lost. Thus, there must be a balance between the decrease in plasticity and the increase in elasticity. The foam stabilizing resin additive of the invention, when used in the foaming reactant mixture, maintains adequate cell wall rigidity and elasticity while there is also the high plasticity essential to maximum expansion, thereby reducing or eliminating cell collapse and assuring the formation of strong, light-weight foamed plastics.

Another object of the invention is to provide alkyd resin-diisocyanate foaming plastic formulations of the class referred to incorporating high molecular weight polymeric resin additives which permit the employment of a higher water content thereby favoring the production of lower density foamed plastics.

Another object of the invention is to provide alkyd-resin-diisocyanate-water formulations of the class referred to wherein the high molecular weight thermoplastic polymeric resin additives promote the production of foamed plastics having very small uniform cells and having greater compression strength, tensile strength, and shock and vibration resistance characteristics.

Another object of the invention is to provide a foaming cellular plastic material of the character referred to in which the high molecular weight thermoplastic polymeric resin additives increase the elasticity of the foaming mass during the critical curing stage thereby relieving internal stresses and minimizing or preventing cracking, especially in foamed masses of large cross section.

A further object of the invention is to provide a cellular foamed plastic material of the class above referred to in which the high molecular weight thermoplastic polymeric resin additive assists in stabilizing the reaction and increases compatibility of the diisocyanate with the alkyd resins so that there is less mixing time required and less tendency for premature reaction.

Other advantages and features of the invention will become apparent from the following detailed description of several typical formulations and their procedures.

The invention provides, generally, the preparation or mixing of an alkyd resin, a diisocyanate and a high molecular weight thermoplastic polymeric resin additive and the subsequent pouring or application of the mixture to react at atmospheric pressure with or without the application of external heat and with or without a post-curing at somewhat elevated temperatures. Further, the invention comprehends, when desired, the incorporation in the reactant mixture of flame retardant additives, metallic soap powders or metallic leafing powders. As will be later described, the fire retardant and flame proofing additives which we prefer to employ, additionally serve to materially increase the volume of the cellular foamed plastic material and the inclusion of the metallic soap powders or the metallic leafing powders may result in superior products.

The alkyd resins which we preferably employ are the reaction products of polyhydric alcohols and polybasic acids unmodified or modified with oil and/or other resins, the alkyd resins having an acid number of from 5 to 80, a water content of from 0.1% to 5% by weight, and having the following ratio range of the hydroxyl groups to the carboxyl groups in the alkyd resin reactants: from 3 hydroxyl (OH):1 carboxyl (COOH) to 4 hydroxyl (OH):5 carboxyl (COOH).

We have found it preferable to employ alkyd resins having an acid number between approximately 10 and approximately 25 and wherein the ratio of the hydroxyl groups to the carboxyl groups is 2 to 1. However, satisfactory results are to be obtained by employing resins having the foregoing ranges of acid numbers and ratios of the hydroxyl to the carboxyl groups in the alkyd resin reactants. The following formulae are suitable for the preparation of unmodified alkyd resins from polyhydric alcohols and polybasic acids.

Formula A

| | Mols |
|---|---|
| Glycerol | 4 |
| Adipic acid | 2.5 |
| Phthalic anhydride | 0.5 |

Formula B

| | Mols |
|---|---|
| Glycerol | 2 |
| 1,4 butylene glycol | 1 |
| Adipic acid | 2 |

Formula C

| | Mols |
|---|---|
| Trimethylol propane | 4 |
| Adipic acid | 2.5 |
| Phthalic anhydride | 0.5 |

Formula D

| | Mols |
|---|---|
| Glycerol | 2 |
| Pentaerithritol | 0.5 |
| Phthalic anhydride | 1 |
| Sebacic acid | 3 |

Excellent results have been obtained by employing the resin of Formula A having an acid number of 16 and a water content of 0.56% by weight and by employing the resin of Formula C having an acid number of 20 and a water content of 0.85% by weight. The ratios of the hydroxyl groups to the carboxyl groups of the alkyd resin reactants in Formulae A, B, C, and D are respectively 2(OH):1(COOH), 2(OH):1(COOH), 2(OH):1(COOH), and 1(OH):1(COOH).

The following Formulae E, F and G are typical or representative of formulae for preparing unmodified alkyd resins from single polyhydric alcohols and single polybasic acids producing resins suitable for use in the method and products of the invention:

Formula E

| | Mols |
|---|---|
| Glycerol | 4 |
| Adipic acid | 3 |

Formula F

| | Mols |
|---|---|
| Trimethylol propane | 3 |
| Phthalic anhydride | 2 |

Formula G

| | Mols |
|---|---|
| Glycerol | 1 |
| Phthalic anhydride | 1.5 |

The respective ratios of the hydroxyl groups to the carboxyl groups of the alkyd resin reactants of Formulae E, F and G are 2(OH):1(COOH), 9(OH):4(COOH) and 1(OH):1(COOH).

Formulae H and I are examples of alkyd resins, oil modified, that have been found to be practical and operative in preparing the foamed cellular plastic materials in accordance with the present invention. The respective ratios of the hydroxyl groups to the carboxyl groups in the alkyd resin reactants of these formulae are $$3(OH):3\tfrac{1}{2}(COOH)$$

and 6(OH):7(COOH).

Formula H

| | Mols |
|---|---|
| Glycerol | 1 |
| Phthalic anhydride | 1.5 |
| Oleic acid | 0.5 |

Formula I

| | Mols |
|---|---|
| Diethylene glycol | 5 |
| Adipic acid | 5 |
| Citric acid | 1 |
| Lactic acid | 1 |

Another example of an oil modified alkyd resin which we have found to be practical and effective in preparing the foamed cellular plastic material is found in Formula J where the ratio of the hydroxyl and carboxyl groups of the alkyd resin reactants is 10½(OH):9(COOH) and where the (OH) group in the ricinoleic acid, or the 3(OH) groups for the castor oil molecule, is taken into account or 7½(OH):9(COOH) when the (OH) groups in the ricinoleic acid is not considered.

Formula J

| | Mols |
|---|---|
| Glycerol | 2.5 |
| Adipic acid | 4 |
| Castor oil | 1 |
| Maleic anhydride | ½ |

An example of a natural resin modified alkyd resin suitable for incorporation in the cellular foamed plastics of the invention is set forth in Formula K where the ratio of the hydroxyl to the carboxyl groups of the alkyd resin reactants is 1(OH):1(COOH).

Formula K

| | | |
|---|---|---|
| Glycerol | gram mol | 1 |
| Sebacic acid | gram mol | 1½ |
| Resin copal | gram | 100 |

An example of a synthetic resin modified alkyd adapted for use in the formulations and method of the invention is set forth in Formula L where the ratio of the hydroxyl groups to the carboxyl groups of the alkyd resin reactants is $$3(OH):2(COOH)$$

Formula L

| | |
|---|---|
| Phenol | 50 grams |
| Formaldehyde | 17 grams |
| Rosin | 65 grams |
| Phthalic anhydride | 30 grams or 0.2 gram mol |
| Glycerol | 18.4 grams or 0.2 gram mol |

The most satisfactory results are obtained when the water content range of the alkyd resin component or components of the reactant foam producing mixture is from 0.1% to 5% by weight, irrespective of the specific manner of incorporating the water in the mixture. In the formulae and examples herein set forth, it will be considered that the water component of the diisocyanate alkyd resin reactant mixture is incorporated by dissolving a calculated amount of water in the selected alkyd resin and suitably agitating the resin-water mixture so that the alkyd resin component will contain the selected or required proportion of water. However, as described in our copending application, Serial No. 35,294, filed June 25, 1948, the water of the reactant mixture may be incorporated therein in combination with a non-ionic wetting agent or by the use of one or more metallic salt hydrates.

The polyisocyanate employed in preparing the reactant cellular foam producing mixture is preferably meta-toluene diisocyanate. The meta-toluene diisocyanate is used in the proportion of from 35 to 150 grams for each 100 grams of the alkyd resin.

As mentioned above and as described in our copending application Serial No. 50,007, the inclusion of a selected proportion of a metallic soap powder in the reactant mixture produces superior results. The metallic soap powders which we have found to be practical and effective in the formulations of the invention are metallic soap powders of fatty acids having from 12 to 20 carbon atoms. Included among such metallic soap powders are: zinc stearate, aluminum stearate, calcium stearate, magnesium stearate, magnesium hydroxy stearate, barium stearate, zinc laurate, calcium oleate, strontium stearate. The proportion of the metallic soap powder employed may range from 1/16 to 7½ grams of the selected metallic soap powder for each 30 grams of the alkyd resin.

It has been found that the inclusion of metallic leafing powders in the alkyd resin polyisocyanate high molecular weight resin mixture results in foamed cellular plastic products of superior physical properties. Our copending application, Serial No. 44,993 describes the use of such metallic leafing powders in the alkyd resin-polyisocyanate reactant mixtures. The metallic leafing powders employed must have the property of leafing when suspended in a liquid vehicle and when so suspended and applied as a paint have the ability of forming a continuous film on the surface of the applied liquid vehicle or paint. It is preferred that the metallic leafing powders be aged for some time after manufacture and prior to inclusion in the reactant mixtures of the invention. The metallic leafing powders which we have found to be practical and effective in the formulations of the invention include: aluminum leafing powder, aluminum bronze leafing powder, gold bronze leafing powder, copper bronze leafing powder, lead leafing powder, nickel leafing powder, silver leafing powder, gold leafing powder, copper leafing powder, stainless steel leafing powder (18:8 chromium-nickel). The metallic leafing powders employed individually or in suitable mixtures may be used in the proportion of from 1/16 to 7½ grams for each 30 grams of the alkyd resin in the polyisocyanate-alkyd resin reactant mixture. Good results have been obtained by employing aluminum leafing powder of such fineness that not more than 2% is retained on a number 325 sieve and by employing aluminum bronze leafing powder, gold bronze leafing powder and copper bronze leafing powder of such fineness that not more than 0.3% is retained on a number 100 sieve.

Excellent results are obtained when both a metallic soap powder and a metallic leafing powder are incorporated in the polyisocyanate-alkyd resin-high molecular weight thermoplastic resin mixture. The combination of such fillers appears to act synergistically, that is the combination of the metallic soap powder and the metallic leafing powder causes the formation of a greater volume of the cellular plastic than if the same proportionate quantity of each individual filler is used separately in the identical polyisocyanate-alkyd resin-high molecular weight thermoplastic resin mixture. When both the metallic leafing powders and the metallic soap powders are used in the formulations of the invention, the metallic leafing powder may be employed in the proportion of from 1/16 to 5 grams for each 30 grams of the alkyd resin and the metallic soap may be used in the proportion of from 1/16 to 5 grams for each gram of the alkyd resin.

The foamed cellular plastic products of the invention may be made flame resistant and self-extinguishing when once ignited by incorporating flame retardant additives in the polyisocyanate-alkyd resin reactant mixture. The additives which we have found to be effective in rendering the cellular material flame resistant are unsaturated alkenyl esters of aryl phosphonic acids, namely compounds having the general formula ArPO(OCH$_2$CR:CHR$^1$)$_2$ where Ar represents aryl and alkaryl hydrocarbon radicals and R and R$^1$ are hydrogen and alkyl hydrocarbon radicals. Compounds of this character are described in United States Letters Patent No. 2,425,765 issued August 19, 1947. Included in this group of compounds are:

1. Diallyl phenyl phosphonate

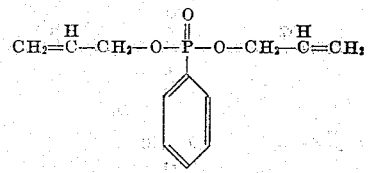

2. Bis(methallyl) benzenephosphonate

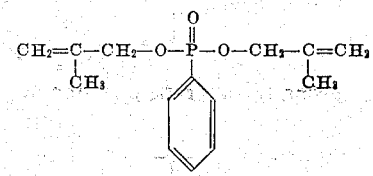

and,

3. Diallyl toluene phosphonate

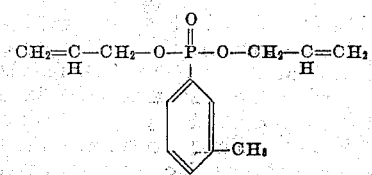

These additives not only serve to impart flame resistance and decrease flame propagation characteristics to the foamed cellular plastic product but also unexpectedly, serve to materially decrease the density of the foamed material. The proportion of the selected fire retardant and flame-proofing additive employed in the polyisocyanate-alkyd resin reactant mixture may be varied considerably but in practice from 1 gram to 20 grams of the additive may be used with each 30 grams of the alkyd resin. It is usually preferred to employ approximately 5 grams of the additive for each 30 grams of the alkyd resin.

If desired, other flame-proofing and fire-retardant agents may be employed together with or in addition to the unsaturated alkyl esters of aryl phosphonic acids described above. Such fire-retardant and flame-proofing agents include tri-chloralkyl phosphates of the general formula

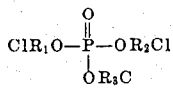

where $R_1$, $R_2$ and $R_3$ are alkyl groups having from 2 to 4 carbon atoms, antimony oxide $Sb_2O_3$ and unsaturated alkyl esters of the alkenyl phosphonic acids of the class described in United States Letters Patent No. 2,425,766 issued August 19, 1947, namely compounds having the general formula $R^2R^3C:CR^4PO(OCH_2CR:CHR^1)_2$ where R, $R^1$ and $R^4$ are hydrogen or alkyl, and $R^2$ and $R^3$ are hydrogen, alkyl or aryl radicals.

Examples of the tri-chloralkyl phosphates which we have found to be effective in the formulations of the invention are:

Tri-B-chlorethyl phosphate

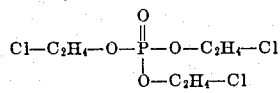

and trichlorpropyl phosphate

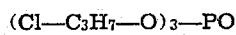

Examples of the unsaturated alkyl esters of alkenyl phosphonic acids which we have found to be practical and effective in the cellular plastic formulations are:

Diallyl isobutene phosphonate

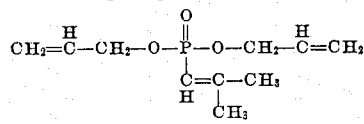

diallyl styrene phosphonate

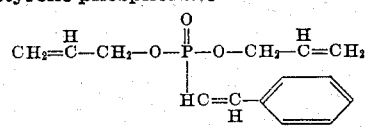

and bis(methallyl) styrene phosphonate

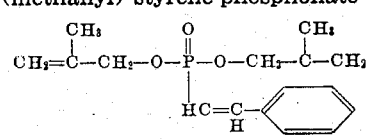

The unsaturated alkyl esters of aryl phosphonic acids, the unsaturated alkyl esters of alkenyl phosphonic acids and the tri-chloralkyl phosphates serve to facilitate mixing of the alkyd resin and the diisocyanate by acting as mutual solvents for both the alkyd resin and the meta-toluene diisocyanate which tends to avoid premature reaction, prior to pouring, due to long mixing time. This is important as it permits the utilization of higher water content alkyd resins which, in turn, can result in a lowered density of the foamed plastic product. The antimony oxide, in addition to serving as a flame-proofing agent, acts as a cell size regulator whereby the cells of the foamed plastic are of smaller size. The unsaturated alkyl esters of alkenyl phosphonic acids may be used in the proportion of from 1 to 20 grams for each 30 grams of the alkyd resin when employed without the unsaturated alkyl esters of aryl phosphonic acids previously named. The tri-chloralkyl phosphates may be used in the proportion of from ½ to 10 grams for each 30 grams of the alkyd resin and when used with the unsaturated alkyl esters of aryl phosphonic acids in the proportion above named may be used in the proportion of ½ to 7½ grams for each 30 grams of the alkyd resin. The antimony oxide may be used in the proportion of from ¼ to 5 grams for each 30 grams of the alkyd resin with or without the addition of the unsaturated alkyd esters of aryl phosphonic acids or the trichloralkyl phosphates.

The present invention is characterized by the inclusion in the reactant mixture of one or more high molecular weight thermoplastic film-forming polymeric resin additives. These additives stabilize the foam during the reaction, permit the use of higher water contents, increase the elasticity of the cell walls during the foaming and perform other functions productive of low density cellular plastics having superior physical properties. The resin additives are soluble in meta-toluene diisocyanate and may or may not react with the meta-toluene diisocyanate. The following resin additives have each been found to be practical and effective in the alkyd resin-diisocyanate reactant systems and when employed in the concentration ranges set forth, do not depend for their action upon the presence of other additives such as the metallic soap powders, the metallic leafing powders or the flame retardants, which latter additives may or may not be included in the alkyd resin-meta-toluene diisocyanate mixture depending upon the intended character of the products and their intended uses. In general, a concentration of the high molecular weight polymeric thermoplastic resin additives of approximately 2 grams for each 100 grams of the meta-toluene diisocyanate gives excellent results, it being understood that the concentrations or proportions of the individual additives depend to a considerable extent upon the nature of the particular additives. The film-forming and foam stabilizing resin additives which we employ in the reactant foamed cellular plastic formulations include: ethyl cellulose, polymeric chlorinated natural rubber, benzyl cellulose, natural rubber, polymeric vinyl chloride-vinyl acetate co-polymers, polyvinyl chloride, polyvinyl acetate, polystyrene, polydichlorostyrene, polymeric acrylate and methacrylate resins and their co-polymers, polyvinyl butyral.

Ethyl cellulose, which we have found to be particularly desirable in the formulations of the invention, is a cellulose ether obtained by the reaction of ethyl chloride with alkali cellulose as follows:

RONa    $ClC_2H_5$    $ROC_2H_5$    NaCl where R represents the cellulose radical. From the structure of the native cellulose

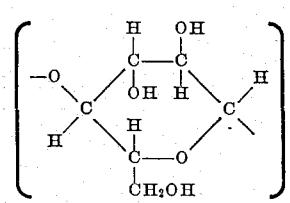

it is seen that each glucose unit has three replaceable OH groups, all or some of which may react as above to form the ether linkages. The molecular weight of ethyl cellulose is high since a cellulose molecule, having 570 recurring glucose units, has a molecular weight of about 130,000. Very satisfactory results have been obtained using commercial grades of ethyl cellulose resins wherein the substitution values are between 2.15 and 2.60 ethoxyl groups for each glucose unit, that is where the ethoxyl content is from 43% to 50%. The preferred ethoxyl content range of the ethyl cellulose resin is from 45.0 to 49.5%. The proportion or concentration of the ethyl cellulose in the reactant alkyd resin-meta-toluene diisocyanate systems of the invention is from 0.03 gram to 15 grams of the ethyl cellulose for each 100 grams of the meta-toluene diisocyanate, the preferred concentration of the ethyl cellulose being between ½ to 5 grams for each 100 grams of the meta-toluene diisocyanate. Very low concentrations of the ethyl cellulose are effective in producing low density foamed plastics having small uniform cells and superior physical characteristics. We believe that the particularly excellent results obtained with only small concentrations of the ethyl cellulose are accounted for, at least in part, by the reaction of the ethyl cellulose with the meta-toluene diisocyanate through addition polymerization between the labile hydrogen atoms of the free (OH) groups in the ethyl cellulose molecules and the isocyanate groups producing soluble, very high molecular weight reactive polyisocyanates. Such a reaction is illustrated as follows:

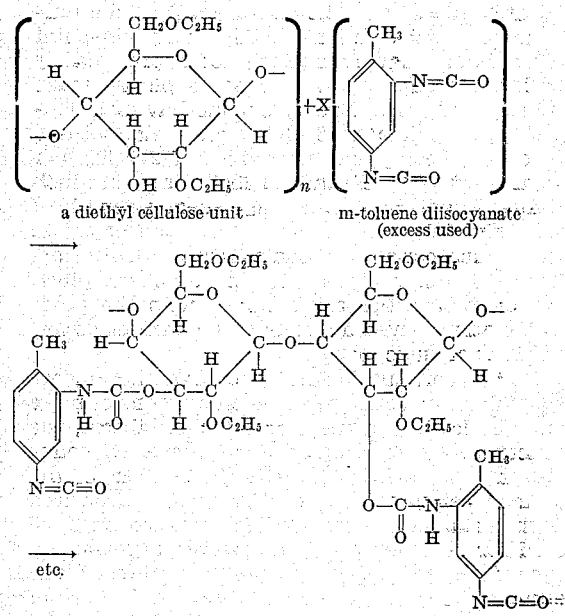

With the extremely low effective concentrations of the ethyl cellulose, for example 0.03 gram of the ethyl cellulose resin per 100 grams of the meta-toluene diisocyanate, it is evident that there is substantially no increase in viscosity of the mixture, particularly where low viscosity ethyl cellulose is used. The effect of the ethyl cellulose is, therefore, not to be ascribed to a viscosity increase but appears to be due to reinforcement and stabilization of the cells of the foaming reactant mixture preventing collapse of the cells and consequent loss of gas pressure. This is substantiated by the fact that an increase in viscosity of the reactant mixture by dissolving low molecular weight resins, and particularly those that are not predominantly linear such as ester gum or glycerol abietate, in the foaming mixture with the foam stabilizers such as metallic soap, metallic leafing powder, omitted does not avoid cell collapse but results in a condition where cell collapse predominates due to insufficient cell reinforcement so that practically no plastic foam volume is obtained. The viscosity of the ethyl cellulose resins which we employ is between 7 and 200 centipoises, and preferably between 50 and 100 centipoises, the viscosity being determined on a 5% by weight solution in a 60:40 toluene-ethenol solvent at 25° C.

The following are typical preferred formulations of the invention incorporating ethyl cellulose resin:

*Example 1*

| | Grams |
|---|---|
| Alkyd resin of Formula C having an acid number of 20 and a water content of 0.85% by weight | 60 |
| Meta-toluene diisocyanate containing 2 grams ethyl cellulose of from 50 to 100 centipoises viscosity and having an ethoxyl content of from 45.0% to 49.5% per 100 grams of the meta-toluene diisocyanate | 40 |

In the formulation of Example 1 the water content of the alkyd resin constituent may range from 0.1% by weight to 5.0% by weight, excellent results having been obtained where the water content of the alkyd resin was as indicated and also at 1%, 1.5%, 2% and 3.5% by weight.

*Example 2*

| | Grams |
|---|---|
| Alkyd resin of Formula C having an acid number of 20 and a water content of 0.85% by weight | 60 |
| Meta-toluene diisocyanate containing 2 grams ethyl cellulose, having a viscosity of 7 centipoises and having an ethoxyl content of from 46.8 to 48.5%, per 100 grams of the meta-toluene diisocyanate | 40 |
| Diallyl phenyl phosphonate | 10 |
| Benzoyl peroxide | 0.50 |

The formulation of Example 2 may be varied by employing an ethyl cellulose resin having a viscosity of as high as approximately 200 centipoises, although preferably the ethyl cellulose resin has a centipoise viscosity of from 50 to 100 and an ethoxyl content of from 45.0% to 49.5%.

*Example 3*

| | Grams |
|---|---|
| Alkyd resin of Formula C having an acid number of 20 and a water content of 0.85% by weight | 60 |
| Meta-toluene diisocyanate containing 0.03 gram ethyl cellulose, having a viscosity of 7 centipoises and an ethoxyl content of from 46.8% to 48.5%, per 100 grams of meta-toluene diisocyanate | 40 |
| Diallyl phenyl phosphonate | 10 |
| Benzoyl peroxide | 0.50 |

In the formulation of Example 3 excellent results have been obtained when the ethyl cellulose resin was of 100 centipoises viscosity and had an ethoxyl content of from 48.0% to 49.5%.

*Example 4*

| | Grams |
|---|---|
| Alkyd resin of Formula C having an acid number of 20 and a water content of 0.85% by weight | 60 |
| Meta-toluene diisocyanate containing 10 grams of ethyl cellulose, having a viscosity of 100 centipoises and an ethoxyl content of from 48.0% to 49.5%, per 100 grams of the meta-toluene diisocyanate | 40 |
| Diallyl phenyl phosphonate | 10 |
| Benzoyl peroxide | 0.50 |

The formulation of Example 4 may be varied by using 15 grams of ethyl cellulose of 15 centipoise viscosity and having an ethoxyl content of from 45.5% to 46.8% per 100 grams of the meta-toluene diisocyanate.

Example 5

| | Grams |
|---|---|
| Alkyd resin of Formula C having an acid number of 20 and a water content of 0.85% by weight | 60 |
| Meta-toluene diisocyanate containing 2 grams of ethyl cellulose, having a viscosity of 100 centipoises and an ethoxyl content of from 48.0% to 49.5%, per 100 grams of the meta-toluene diisocyanate | 40 |
| Diallyl phenyl phosphonate | 40 |
| Benzoyl peroxide | 2 |

In Example 5, the concentration of the diallyl phenyl phosphonate may be reduced to 20 grams in which case 1.0 gram of benzoyl peroxide is employed, or the concentration of the diallyl phenyl phosphonate may be reduced to 30 grams in which case 1.5 grams of benzoyl peroxide is used.

Example 6

| | Grams |
|---|---|
| Alkyd resin of Formula C having an acid number of 20 and a water content of 0.85% by weight | 60 |
| Meta-toluene diisocyanate containing 2 grams of ethyl cellulose, having a viscosity of 100 centipoises and an ethoxyl content of from 48.0% to 49.5%, per 100 grams of the meta-toluene diisocyanate | 40 |
| Zinc stearate | 3 |
| Diallyl phenyl phosphonate | 10 |
| Benzoyl peroxide | 0.5 |

Example 7

| | Grams |
|---|---|
| Alkyl resin of Formula C having an acid number of 20 and a water content of 0.85% by weight | 60 |
| Meta-toluene diisocyanate containing 2 grams of ethyl cellulose, having a viscosity of 100 centipoises and an ethoxyl content of from 48.0% to 49.5% per 100 grams of the metatoluene diisocyanate | 40 |
| Zinc stearate | 3 |
| Aluminum leafing powder | ½ |

In Examples 6 and 7, the concentration of the zinc stearate powder may be reduced to ¼ gram while the concentration of the aluminum leafing powder may be increased to either 1 fram or 2 grams when employed with the ¼ gram of the zinc stearate powder.

Example 8

| | Grams |
|---|---|
| Alkyd resin of Formula A having an acid number of 16 and a water content of 0.56% by weight | 60 |
| Meta-toluene diisocyanate containing 2 grams ethyl cellulose of 100 centipoise vistosity and an ethoxyl content of from 48.0% to 49.5% per 100 grams of the meta-toluene diisocyanate | 40 |
| Diallyl phenyl phosphonate | 10 |
| Benzoyl peroxide | 0.5 |
| Zinc stearate powder | ½ |
| Aluminum leafing powder | 4 |

The formulation of Example 8 may be modified by omitting the metallic leafing powder and by employing 1 gram of the zinc stearate powder. Example 8 may also be modified by increasing the water content of the alkyd resin constituent to 0.75% by weight and by employing 2 grams of the zinc stearate powder while omitting the aluminum leafing powder.

To demonstate the effectiveness of the ethyl cellulose resin additive the following constituents may be mixed together and poured into a cell or mold 6″ high, 6″ long and 1″ wide, maintaining the mold at a temperature of about 120° F.:

| | Grams |
|---|---|
| Alkyd resin of Formula C having an acid number of 20 and a water content of 0.85% by weight | 60 |
| Meta-toluene diisocyanate | 40 |
| Diallyl phenyl phosphonate | 10 |
| Benzoyl peroxide | 0.50 |

It will be found that this mixture will rise about 1 inch in the mold cavity, giving practically no foam value and resulting in a product having a calculated density of approximately 70 lbs. per cubic foot. However, by repeating this identical procedure with the exception of adding 2 grams of ethyl cellulose of 100 centipoise viscosity and from 48% to 49.5% ethoxyl content for each 100 grams of the meta-toluene diisocyanate employed, it will be found that the mixture will yield a uniformly foamed cellular plastic having pin-point size cells and having a density of approximately 8.5 lbs. per cubic foot. A foamed plastic made in accordance with Example 2 and having a density of approximately 8.50 lbs. per cubic foot had an average compressive strength of 270 lbs. per square inch at 80° F. and 182 lbsfl per square inch at 165° F. and had an average shear strength of approximately 125 lbs. per square inch at 80° F. and 110 lbs. per square inch at 165° F. Uniformly foamed cellular plastics having excellent physical characteristics are obtained with the other fromulations given above having densities as low as 3 lbs. per cubic foot.

In the formulations of the invention incorporating ethyl cellulose and including one or more metallic leafing powders as foam stabilizers, the concentration or proportion of the ethyl cellulose may be varied to control the cell-size of the foamed cellular plastics. This may be desired or important where the cellular plastics are to be used for ornamental or decorative purposes. In such formulations very small amounts of the ethyl cellulose may be used and gradations in the amount of the ethyl cellulose result in foamed cellular products having cells of different sizes. Examples 8-A, 8-B and 8-C illulstrate this.

Example 8-A

| | Grams |
|---|---|
| Alkyd resin of Formula C having an acid number of 20 and a water content of 2% by weight | 30 |
| Meta-toluene diisocyanate | 20 |
| Ethyl cellulose having a centipoise viscosity of 100 and an ethoxy content of from 48.0% to 49.5% | 0.005 |
| Copper leafing powder | 2 |
| Diallyl phenyl phosphonate | 5 |
| Benzoyl peroxide | ¼ |

The approximate cell size of the cellular plastic produced from Example 8-A is 3/16 inch in diameter.

Example 8-B

| | Grams |
|---|---|
| Alkyd resin of Formula C having an acid number of 20 and a water content of 2% by weight | 30 |
| Meta-toluene diisocyanate | 20 |
| Ethyl cellulose having a centipoise viscosity of 100 and an ethoxyl content of from 48.0% to 49.5% | 0.01 |
| Copper leafing powder | 2 |
| Diallyl phenyl phosphonate | 5 |
| Benzoyl peroxide | ¼ |

The cells of the foamed plastic of Example 8-B have a diameter of about 1/16 inch.

Example 8-C

| | Grams |
|---|---|
| Alkyd resin of Formula C having an acid number of 20 and a water content of 2% by weight | 30 |
| Meta-toluene diisocyanate | 20 |
| Ethyl cellulose having a centipoise viscosity of 100 and an ethoxyl content of from 48.0% to 49.5% | 0.015 |
| Copper leafing powder | 2 |
| Diallyl phenyl phosphonate | 5 |
| Benzoyl peroxide | ¼ |

The cells in this case have a diameter of from approximately 3/32 to 1/64 inch. In these formulations it will be noted that only very minor proportions of ethyl cellulose are used and in practice the amount of ethyl cellulose employed may be as low as 0.02 grams for each 100 grams of the meta-toluene diisocyanate.

The chlorination of natural rubber yields a product containing approximately 67% chlorine. Thus:

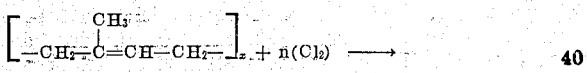

a mixture of two products having an average chlorine content of 67%:

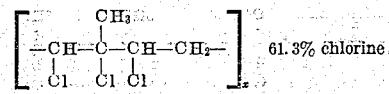 61.3% chlorine and

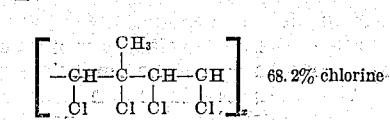 68.2% chlorine

The chlorinated rubber is usually produced to have this 67% chlorine content but is available in several viscosity types, those of higher viscosity having larger molecules. The viscosity designations of the chlorinated rubber are in centipoises and are determined using 20% by weight of the resin in toluene at 25° C.

Benzyl cellulose is formed by the reaction between alkali cellulose and benzyl chloride.

Polystyrene is represented by:

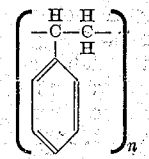

Polydichlorostyrene is represented by:

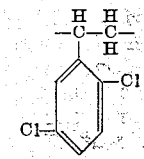

Natural rubber (polymeric isoprene) may be represented by:

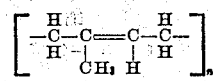

and has a molecular weight ranging between 100,000 and 300,000.

Polyvinyl butyral is represented by:

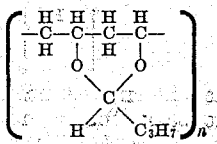

The polymeric vinyl chloride-vinyl acetate copolymers that we have found to be effective in our formulations contain approximately 87% vinyl chloride and 13% vinyl acetate and have molecular weights of between 6,000 and 25,000. This class of co-polymers may be represented as follows:

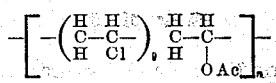

It has also been found that such co-polymers containing from 90% to 95% vinyl chloride are also practical and operative in our cellular foamed plastic formulations.

The polyvinyl acetates which are obtained by the polymerization of vinyl acetate that are suitable for use in our invention have molecular weights ranging from 10,000 to 50,000.

The polyvinyl chloride as employed in the reactant foam producing mixture has an average molecular weight of about 5,000 and is represented by:

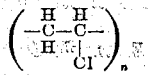

The polymeric acrylate and methacrylate resins and their copolymers, prepared by polymerizing the lower esters of acrylic and methacrylic acid, are further examples of high molecular weight thermoplastic resins adapted to be employed as film forming and foam stabilizing additives in the reactant mixture. These include polymers of the following esters:

(a) Methyl methacrylate, $H_2C=C-O-CH_3$
    $|$
    $CH_3$ with the polymer represented by the type formula:

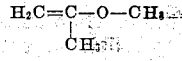

(b) Propyl methacrylate,

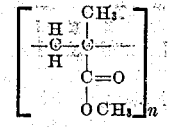

(c) Isobutyl methacrylate,

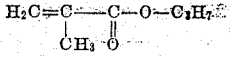

(d) Butyl methacrylate,

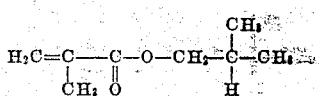

(e) Co-polymer of methyl acrylate and ethyl methacrylate:

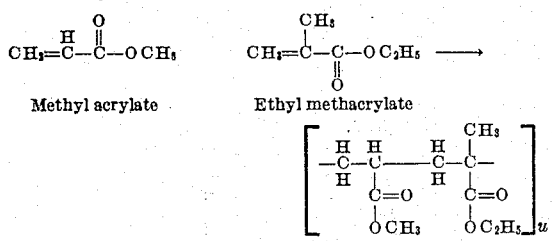

Methyl acrylate    Ethyl methacrylate

The polymeric chlorinated natural rubber is preferably employed in the formulations of the invention in the concentration range of from 5 to 20 grams of the chlorinated natural rubber for each 100 grams of the meta-toluene diisocyanate. The viscosity of the polymeric chlorinated natural rubber may be between 5 and 1,000 centipoises. The following are typical formulations incorporating the polymeric chlorinated natural rubber:

*Example 9*

| | Grams |
|---|---|
| Alkyd resin of Formula C having an acid number of 20 and a water content of 0.85% by weight | 60 |
| Meta-toluene diisocyanate containing 10 grams chlorinated natural rubber having a viscosity of 10 centipoises per 100 grams of the meta-toluene diisocyanate | 40 |
| Diallyl phenyl phosphonate | 10 |
| Benzoyl peroxide | ½ |

In the formulation of Example 9 we have found that foamed cellular plastics of good physical properties and of low density are obtained when the viscosity of the chlorinated natural rubber is 20 centipoises, 143 centipoises and 980 centipoises.

*Example 10*

| | Grams |
|---|---|
| Alkyd resin of Formula C having an acid number of 20 and a water content of 0.85% by weight | 30 |
| Meta-toluene diisocyanate containing 2.5 grams chlorinated natural rubber of 980 centipoises viscosity per 100 grams of meta-toluene diisocyanate | 20 |
| Diallyl phenyl phosphonate | 5 |
| Benzoyl peroxide | 0.25 |

The benzyl cellulose, when employed as a film-forming and cell stabilizing resin additive in the alkyd resin-diisocyanate reactant mixture, is used in the concentration of from ½ to 10 grams for each 100 grams of the meta-toluene diisocyanate. The following is a typical example of the invention incorporating benzyl cellulose as a resin additive:

*Example 11*

| | Grams |
|---|---|
| Alkyd resin of Formula C having an acid number of 20 and a water content of 0.85% by weight | 60 |
| Meta-toluene diisocyanate containing 4 grams of benzyl cellulose per 100 grams of the meta-toluene diisocyanate | 40 |
| Diallyl phenyl phosphonate | 10 |
| Benzoyl peroxide | ½ |

When the polymeric vinyl chloride-vinyl acetate co-polymer is used as the resin additive in the alkyd resin-diisocyanate reactant mixture the concentration of the co-polymer may be from ½ to 10 grams for each 100 grams of the meta-toluene diisocyanate. It is preferred to employ a co-polymer containing approximately 87% vinyl chloride and approximately 13% vinyl acetate. The following is a typical formulation incorporating such a co-polymer as the resin additive.

*Example 12*

| | Grams |
|---|---|
| Alkyd resin of Formula C having an acid number of 20 and a water content of 0.85% by weight | 60 |
| Meta-toluene diisocyanate containing 4 grams of the polymeric vinyl chloride-vinyl acetate co-polymer for each 100 grams of the meta-toluene diisocyanate | 40 |
| Diallyl phenyl phosphonate | 10 |
| Benzoyl peroxide | ½ |

Excellent results have also been obtained by reducing the concentration of the polymeric vinyl chloride-vinyl acetate co-polymer in Example 12 to 2 grams of the co-polymer resin for each 100 grams of the meta-toluene diisocyanate.

Likewise, satisfactory results have been obtained in the formulation of Example 12 where the co-polymer contained from 90% to 95% vinyl chloride.

As described above, polyvinyl chloride, polyvinyl acetate, polystyrene and polydichlorostyrene are suitable as the high molecular weight thermoplastic resin additive and good results have been obtained by employing these resins in the formulation of Example 11 in substitution for the benzyl cellulose. Likewise, polymeric methyl methacrylate has been found to be suitable as the resin additive of Example 12 in place of the co-polymer resin when used in the proportion or concentration of 2 grams for each 100 grams of the meta-toluene diisocyanate. In Examples 9 through 12, employing the resin additives named therein and the resins just mentioned, foamed cellular plastics of uniform structure and of a density of approximately 8½ lbs. per cubic foot are produced. It will be observed that in these examples and with these resins, the metallic leafing powders and the metallic soap powders have been omitted and yet excellent results are obtainable, it being understood that the metallic leafing powders, the metallic soap powders and/or the above described flame proofing additives may be incorporated in the formulations if desired.

In carrying out the method in the production of foamed cellular plastics, the selected ingredients are simply mixed thoroughly in the ratio designed to produce a foamed plastic having the desired density and physical characteristics and this mixture is then poured into the mold or cavity in the structure in which it is to form a part or is applied to a structural surface or the like. The reactant mixture is allowed to react at atmospheric pressure either with or without the application of external heat or attended by a moderate heating of, say, between 120° F. and 150° F. depending upon the size of the batch, etc. The reaction is permitted to go on to completion to produce the foamed cellular product. The cellular foamed plastic product may then be subjected to a post-curing of from 10 to 20 hours at a temperature of from 125° F. to 225° F. to continue the polymerization of the reaction and thus obtain a stronger, more heat stable and more solvent resistant material. The plastic will firmly and uniformly adhere to the surfaces of practically any solid material during the foaming reaction and is thus particularly well suited for use in laminating operations and where it is desired to provide a low density filler or core material of good strength characteristics which adheres to the surfaces which it contacts. As above pointed out, the foamed cellular plastic material has extremely small or pin-point size cells that are substantially spherical and that are non-communicating, these cells being uniformly distributed throughout the entire mass.

It should be understood that the invention is not based upon or dependent upon the theories which we have expressed. Nor is the invention to be regarded as limited to the express procedure or materials set forth, these details being given only by way of illustration and to aid in clarifying the invention. We do not regard such specific details as essential to the invention except insofar as they are expressed by way of limitation in the following claims in which it is our intention to claim all novelty inherent in the invention as broadly as is permissible in view of the prior art.

We claim:

1. A cellular reaction product of an alkyd resin having a water content of from 0.1% to 5% by weight, an acid number of from 5 to 80 and wherein the hydroxyl and carboxyl groups of the alkyd resin reactants are in the ratio range of from 3(OH):1(COOH) to 4(OH):5(COOH), from 35 to 150 parts by weight of meta-toluene diisocyanate for each 100 parts by weight of said resin, and from 0.03 to 15 parts by weight for each 100 parts of the meta-toluene diisocyanate of ethyl cellulose soluble in meta-toluene diisocyanate and having a centipoise viscosity of between 7 and 200, the viscosity of the ethyl cellulose being determined on a 5% by weight solution in a 60:40 toluene-ethanol solvent at 25° C.

2. The cellular reaction product of, on an approximate weight basis; an alkyd resin having a water content of from 0.1% to 5% by weight prepared from 4 mols trimethylol propane, 2.5 mols adipic acid and 0.5 mol phthalic anhydride and having an acid number of from 5 to 80; from 10 to 40 grams of meta-toluene diisocyanate for each 30 grams of said alkyd resin, from 0.03 to 15 parts by weight of ethyl cellulose soluble in meta-toluene diisocyanate for each 100 parts by weight of the meta-toluene diisocyanate.

3. The cellular reaction product of, on an approximate weight basis; an alkyd resin having a water content of from 0.1% to 5% by weight prepared from 4 mols trimethylol propane, 2.5 mols adipic acid and 0.5 mol phthalic anhydride and having an acid number of from 5 to 80; from 10 to 40 grams of meta-toluene diisocyanate for each 30 grams of said alkyd resin, 2 parts of ethyl cellulose having an ethoxyl content of 45% to 49.5% and a viscosity of from 50 to 100 centipoises for each 100 parts of the meta-toluene diisocyanate, the viscosity of the ethyl cellulose being determined on the basis of a 5% by weight solution in a 60:40 toluene-ethanol solvent at 25° C., and from 1 to 20 grams for each 30 grams of said alkyd resin of an alkenyl ester of an aryl phosphonic acid chosen from the group consisting of: diallyl phenyl phosphonate, bis (methallyl) benzene-phosphonate, diallyl toluene phosphonate.

4. The cellular reaction product of an alkyd resin having a water content of from 0.1% to 5% by weight, an acid number of from 5 to 80 and wherein the hydroxyl and carboxyl groups of the alkyd resin reactants are in the ratio range of from 3(OH):1(COOH) to 4(OH):5(COOH), from 35 to 150 parts by weight of meta-toluene diisocyanate for each 100 parts by weight of said resin, from 0.03 to 15 parts by weight for each 100 parts of the meta-toluene diisocyanate of ethyl cellulose soluble in meta-toluene diisocyanate having a centipoise viscosity of between 7 and 200 as determined on a 5% by weight solution in a 60:40 toluene-ethanol solvent at 25° C., and an ethoxyl content of from 43% to 50%.

5. The cellular reaction product of an alkyd resin having a water content of from 0.1% to 5% by weight, an acid number of from 5 to 80 and wherein the hydroxyl and carboxyl groups of the alkyd resin reactants are in the ratio range of from 3(OH):1(COOH) to 4(OH):5(COOH), from 35 to 150 parts by weight of meta-toluene diisocyanate for each 100 parts by weight of said resin, and from ½ to 5 parts by weight of ethyl cellulose for each 100 parts by weight of the meta-toluene diisocyanate, the ethyl cellulose being soluble in meta-toluene diisocyanate and having a centipoise viscosity of between 50 and 100 as determined on a 5% by weight solution in a 60:40 toluene-ethanol solvent at 25° C. and having an ethoxyl content of between 45% and 49.5%.

6. The cellular reaction product of an alkyd resin having a water content of from 0.1% to 5% by weight, an acid number of from 5 to 80 and wherein the hydroxyl and carboxyl groups of the alkyd resin reactants are in the ratio range of from 3(OH):1(COOH) to 4(OH):5(COOH), from 35 to 150 parts by weight of meta-toluene diisocyanate for each 100 parts by weight of said alkyd resin, from 1 to 20 parts by weight for each 30 parts by weight of said alkyd resin of an alkenyl ester of an aryl phosphonic acid chosen from the group consisting of: diallyl phenyl phosphonate, bis (methallyl) benzenephosphonate, diallyl toluene phosphonate, and approximately 2 parts by weight for each 100 parts by weight of the meta-toluene diisocyanate of a thermoplastic polymeric film-former soluble in meta-toluene diisocyanate chosen from the group consisting of: ethyl cellulose, polymeric chlorinated natural rubber, benzyl cellulose, vinyl chloride-vinyl acetate co-polymer (from 87% to 95% vinyl chloride), polyvinyl chloride, polyvinyl acetate, polyvinyl butyral, polystyrene, polydichlorostyrene, polymeric methyl methacrylate, polymeric propyl methacrylate, polymeric isobutyl methacrylate, polymeric butyl methacrylate, co-polymer of methyl acrylate and ethyl methacrylate natural rubber.

7. The cellular reaction product of, on an approximate weight basis; an alkyd resin having a water content of from 0.1% to 5% by weight prepared from 4 mols trimethylol propane, 2.5 mols adipic acid and 0.5 mol phthalic anhydride and having an acid number of from 5 to 80; from 10 to 40 grams of meta-toluene diisocyanate for each 30 grams of said alkyd resin, from 1 to 20 parts by weight for each 30 parts by weight of said alkyd resin of an alkenyl ester of an aryl phosphonic acid chosen from the group consisting of: diallyl phenyl phosphonate, bis (methallyl) benzenephosphonate, diallyl toluene phosphonate, and approximately 2 parts by weight for each 100 parts by weight of the meta-toluene diisocyanate of a thermoplastic polymeric film-former soluble in meta-toluene diisocyanate chosen from the group consisting of: ethyl cellulose, polymeric chlorinated natural rubber, benzyl cellulose, vinyl chloride-vinyl acetate co-polymer (from 87% to 95% vinyl chloride), polyvinyl chloride, polyvinyl acetate, polyvinyl butyral, polystyrene, polydichlorostyrene, polymeric methyl methacrylate, polymeric propyl methacrylate, polymeric isobutyl methacrylate, polymeric butyl methacrylate, co-polymer of methyl acrylate and ethyl methacrylate natural rubber.

8. The cellular reaction product of, on an approximate weight basis; an alkyd resin having a water content of from 0.1% to 5% by weight prepared from 4 mols trimethylol propane, 2.5 mols adipic acid and 0.5 mol phthalic anhydride and having an acid number of from 5 to 80; from 10 to 40 grams of meta-toluene diisocyanate for each 30 grams of said alkyd resin, from 1 to 20 grams for each 30 grams of said alkyd resin of an alkenyl ester of an aryl phosphonic acid chosen from the group consisting of: diallyl phenyl phosphonate, bis (methallyl) benzenephosphonate, diallyl toluene phosphonate, from 0.03 to 15 parts by weight of ethyl cellulose soluble in meta-toluene diisocyanate for each 100 parts by weight of the meta-toluene diisocyanate.

9. The cellular reaction product of, on an approximate weight basis; an alkyd resin having a water content of from 0.19% to 5% by weight prepared from 4 mols trimethylol propane, 2.5 mols adipic acid and 0.5 mol phthalic anhydride and having an acid number of from 5 to 80; from 10 to 40 grams of meta-toluene diisocyanate for each 30 grams of said alkyd resin, from 1 to 20 grams for each 30 grams of said alkyd resin of diallyl phenyl phosphonate, from 0.03 to 15 parts by weight of ethyl cellulose soluble in meta-toluene diisocyanate for each 100 parts by weight of the meta-toluene diisocyanate.

10. The cellular reaction product of, on an approximate weight basis; an alkyd resin having a water content of from 0.1% to 5% by weight prepared from 4 mols trimethylol propane, 2.5 mols adipic acid and 0.5 mol phthalic anhydride and having an acid number of from 5 to 80; from 10 to 40 grams of meta-toluene diisocyanate for each 30 grams of said alkyd resin, from 0.03 to 15 parts by weight of ethyl cellulose soluble in meta-toluene diisocyanate for each 100 parts by weight of the meta-toluene diisocyanate, and a small amount of a metallic soap powder chosen from the group consisting of: zinc stearate, aluminum stearate, calcium stearate, magnesium stearate, strontium stearate, magnesium hydroxy stearate, barium stearate, zinc laurate, calcium oleate.

11. The cellular reaction product of an alkyd resin having a water content of from 0.1% to 5% by weight, an acid number of from 5 to 80 and wherein the hydroxyl and carboxyl groups of the alkyd resin reactants are in the ratio range of from 3(OH):1(COOH) to 4(OH):5(COOH), from 35 to 150 parts by weight of meta-toluene diisocyanate for each 100 parts by weight of said resin, from 0.03 to 15 parts by weight of ethyl cellulose soluble in meta-toluene diisocyanate for each 100 parts by weight of the meta-toluene diisocyanate, and from $\frac{1}{16}$ to 7.5 parts by weight for each 30 parts by weight of said alkyd resin of a metallic leafing powder chosen from the group consisting of: aluminum leafing powder, aluminum bronze leafing powder, gold bronze leafing powder, copper bronze leafing powder, lead leafing powder, nickel leafing powder, silver leafing powder, gold leafing powder, copper leafing powder, stainless steel leafing powder (18:8 chromium-nickel).

12. The cellular reaction product of an alkyd resin having a water content of from 0.1% to 5% by weight, an acid number of from 5 to 80 and wherein the hydroxyl and carboxyl groups of the alkyd resin reactants are in the ratio range of from 3(OH):1(COOH) to 4(OH):5(COOH) approximately 20 parts by weight of meta-toluene diisocyanate for each 30 parts by weight of said alkyd resin, from 0.005 to 0.015 parts by weight of ethyl cellulose soluble in meta-toluene diisocyanate for each 30 parts by weight of said alkyd resin, and approximately 2 parts by weight for each 30 parts by weight of said alkyd resin of a metallic leafing powder chosen from the group consisting of: aluminum leafing powder, aluminum bronze leafing powder, gold bronze leafing powder, copper bronze leafing powder, lead leafing powder, nickel leafing powder, silver leafing powder, gold leafing powder, copper leafing powder, stainless steel leafing powder (18:8 chromium-nickel).

13. The cellular reaction product of an alkyd resin having a water content of from 0.1% to 5% by weight, an acid number of from 5 to 80 and wherein the hydroxyl and carboxyl groups of the alkyd resin reactants are in the ratio range of from 3(OH):1(COOH) to 4(OH):5(COOH), approximately 20 parts by weight of meta-toluene diisocyanate for each 30 parts by weight of said alkyd resin, from 0.005 to 0.015 parts by weight of ethyl cellulose soluble in meta-toluene diisocyanate for each 30 parts by weight of said alkyd resin, approximately 5 parts by weight of diallyl phenyl phosphonate for each 30 parts by weight of said resin, a small amount of benzoyl peroxide, and approximately 2 parts by weight for each 30 parts by weight of said alkyd resin of a metallic leafing powder chosen from the group consisting of: aluminum leafing powder, aluminum bronze leafing powder, gold bronze leafing powder, copper leafing powder, copper bronze leafing powder, lead leafing powder, nickel leafing powder, silver leafing powder, gold leafing powder, stainless steel leafing powder (18:8 chromium-nickel).

14. The reaction product of an alkyd resin having a water content of from 0.1% to 5% by weight, an acid number of from 5 to 80 and wherein the hydroxyl and carboxyl groups of the alkyd resin reactants are in the ratio range of from 3(OH):1(COOH) to 4(OH):5(COOH), from 35 to 150 parts by weight of meta-toluene diisocyanate for each 100 parts by weight of said resin, and from 5 to 20 parts by weight of polymeric chlorinated natural rubber for each 100 parts by weight of the meta-toluene diisocyanate, from 1 to 20 parts by weight for each 30 parts by weight of said alkyd resin of a fire retardant alkenyl ester of aryl phosphonic acid additive chosen from the group consisting of: diallyl phenyl phosphonate bis (methallyl) benzenephosphonate diallyl toluene phosphonate.

15. The cellular reaction product of, on an approximate weight basis; an alkyd resin having a water content of from 0.1% to 5% by weight prepared from 4 mols trimethylol propane, 2.5 mols adipic acid and 0.5 mol phthalic anhydride and having an acid number of from 5 to 80; from 10 to 40 grams of meta-toluene diisocyanate for each 30 grams of said alkyd resin, from 5 to 20 grams of polymeric chlorinated natural rubber having a centipoise viscosity of about 10 for each 100 grams of the meta-toluene diisocyanate, determined by using 20% by weight of the resin in toluene at 25° C., and about 5 grams of diallyl phenyl phosphonate for each 30 grams of said alkyd resin.

16. The reaction product of an alkyd resin having a water content of from 0.1% to 5% by weight, an acid number of from 5 to 80 and and wherein the hydroxyl and carboxyl groups of the alkyd resin reactants are in the ratio range of from 3(OH):1(COOH) to

4(OH):5(COOH)

from 35 to 150 parts by weight of meta-toluene diisocyanate for each 100 parts by weight of said resin, and from 0.5 to 10 parts by weight of benzyl cellulose for each 100 parts by weight of the meta-toluene diisocyanate, from 1 to 20 parts by weight for each 30 parts by weight of said alkyd resin of a fire retardant alkenyl ester of aryl phosphonic acid additive chosen from the group consisting of: diallyl phenyl phosphonate bis (methallyl) benzenephosphonate diallyl toluene phosphonate.

17. The cellular reaction product of, on an approximate weight basis; an alkyd resin having a water content of from 0.1% to 5% by weight prepared from 4 mols trimethylol propane, 2.5 mols adipic acid and 0.5 mol phthalic anhydride and having an acid number of from 5 to 80; from 10 to 40 grams of meta-toluene diisocyanate for each 30 grams of said alkyd resin, approximately 5 grams of diallyl phenyl phosphonate for each 30 grams of said resin, and approximately 4 grams of benzyl cellulose for each 100 grams of the meta-toluene diisocyanate.

18. The cellular reaction product of, on an approximate weight basis; 60 grams of an alkyd resin having a water content of about 0.85% by weight, an acid number of about 20 prepared from 4 mols trimethylol propane, 2.5 mols adipic acid, and 0.5 mol phthalic anhydride, 40 grams meta-toluene diisocyanate containing 2 grams ethyl cellulose of from 50 to 100 centipoise viscosity, as determined from a 5% by weight solution of the ethyl cellulose in a 60:40 toluene-ethanol solvent at 25° C., and having from 45 to 49.5% ethoxyl content for each 100 grams of the meta-toluene diisocyanate, the ethyl cellulose being soluble in meta-toluene diisocyanate, and 10 grams diallyl phenyl phosphonate.

19. The cellular reaction product of, on an approximate weight basis; 60 grams of an alkyd resin having a water content of about 0.85% by weight, an acid number of about 20 prepared from 4 mols trimethylol propane, 2.5 mols adipic acid, and 0.5 mol phthalic anhydride, 40 grams meta-toluene diisocyanate containing 2 grams ethyl cellulose of from 50 to 100 centipoise viscosity, as determined from a 5% by weight solution of the ethyl cellulose in a 60:40 toluene-ethanol solvent at 25° C., and having from 45 to 49.5% ethoxyl content for each 100 grams of the meta-toluene diisocyanate, the ethyl cellulose being soluble in meta-toluene diisocyanate, 10 grams diallyl phenyl phosphonate, and 0.5 gram benzoyl peroxide.

20. The method of making cellular plastic which comprises providing an alkyd resin having an acid number of from 5 to 80 and a water content of from 0.1% to 5% by weight and wherein the hydroxyl and carboxyl groups in the alkyd resin reactants are in the ratio range of from 3(OH):1(COOH) to 4(OH):5(COOH), mixing said alkyd resin and from 35 to 150 parts by weight of meta-toluene diisocyanate for each 100 parts by weight of said alkyd resin and from 0.03 to 15 parts by weight of ethyl cellulose soluble in meta-toluene diisocyanate for each 100 parts of the meta-toluene diisocyanate, and then allowing the resultant mixture to react.

21. The method of making cellular plastic which comprises providing an alkyd resin having an acid number of from 5 to 80 and a water content of from 0.1% to 5% by weight and wherein the hydroxyl and carboxyl groups in the alkyd resin reactants are in the ratio range of from 3(OH):1(COOH) to 4(OH):5(COOH), mixing said alkyd resin and from 35 to 150 parts by weight of meta-toluene diisocyanate for each 100 parts by weight of said alkyd resin, from 1 to 20 parts by weight for each 30 parts by weight of said alkyd resin of a fire retardant alkenyl ester of arylphosphonic acid additive chosen from the group consisting of: diallyl phenyl phosphonate, bis (methallyl) benzenephosphonate, diallyl toluene phosphonate, and a small amount of a thermoplastic film-forming polymer soluble in meta-toluene diisocyanate, and then allowing the resultant mixture to react.

22. The method of making cellular plastic which comprises providing an alkyd resin having an acid number of from 5 to 80 and a water content of from 0.1% to 5% by weight and wherein the hydroxyl and carboxyl groups in the alkyd resin reactants are in the ratio range of from 3(OH):1(COOH) to 4(OH):5(COOH), mixing said alkyd resin and from 35 to 150 parts by weight of meta-toluene diisocyanate for each 100 parts by weight of said alkyd resin and approximately 2 parts for each 100 parts of the meta-toluene diisocyanate of ethyl cellulose having a centipoise viscosity of from 50 to 100 as determined from a 5% by weight solution of the ethyl cellulose in a 60:40 toluene-ethanol solvent at 25° C., and having an ethoxyl content of from 45% to 49.5% and soluble in meta-toluene diisocyanate, and then allowing the resultant mixture to react.

23. The cellular reaction product of, on an approximate weight basis; an alkyd resin having a water content of from 0.1% to 5% by weight, an acid number of from 5 to 80 and wherein the hydroxyl and carboxyl groups of the alkyd resin reactants are in the ratio of from 3(OH):1(COOH) to 4(OH):5(COOH), from 35 to 150 parts of meta-toluene diisocyanate for each 100 parts of said resin, from 1 to 20 parts of diallyl phenyl phosphonate for each 30 parts of said resin, from 0.03 to 15 parts of ethyl cellulose soluble in meta-toluene diisocyanate for each 100 parts of the meta-toluene diisocyanate, and a small amount of a metallic soap powder chosen from the group consisting of: zinc stearate, aluminum stearate, calcium stearate, magnesium stearate, strontium stearate, magnesium hydroxy stearate, barium stearate, zinc laurate, calcium oleate.

24. The cellular reaction product of, on an approximate weight basis; an alkyd resin having a water content of from 0.1% to 5% by weight, an acid number of from 5 to 80 and wherein the hydroxyl and carboxyl groups of the alkyd resin reactants are in the ratio of from 3(OH):1(COOH) to 4(OH):5(COOH), from 35 to 150 parts of meta-toluene diisocyanate for each 100 parts of said resin, from 1 to 20 parts of diallyl phenyl phosphonate for each 30 parts of said resin, from 0.03 to 15 parts of ethyl cellulose soluble in meta-toluene diisocyanate for each 100 parts of the meta-toluene diisocyanate, and a small amount of a metallic leafing powder chosen from the group consisting of: aluminum leafing powder, aluminum bronze leafing powder, gold bronze leafing powder, copper bronze leafing powder, lead leafing powder, nickel leafing powder, silver leafing powder, gold leafing powder, copper leafing powder, stainless steel leafing powder (18:8 chromium-nickel).

ELI SIMON.
FRANK W. THOMAS.

REFERENCES CITED

The following references are of record in the file of this patent:

UNITED STATES PATENTS

| Number | Name | Date |
|---|---|---|
| 2,282,827 | Rothrock | May 12, 1942 |
| 2,498,621 | Kropa et al. | Feb. 21, 1950 |

FOREIGN PATENTS

| Number | Country | Date |
|---|---|---|
| 111,120 | Australia | of 1940 |

OTHER REFERENCES

De Bell et al.: "German Plastics Practice"; pages 300, 301, 310–316, 463–465, published by De Bell & Richardson, Springfield, Mass., 1946.

Edwards: "Aluminum Paint and Powder"; 2nd ed., p. 9 and 10, published 1936 by Remhold Pub. Corp. N. Y.

Ethocel Handbook: pp. 4 and 5; published 1940 by Dow Chem. Co., Midland, Mich.